(12) United States Patent
Ellis et al.

(10) Patent No.: US 11,526,015 B2
(45) Date of Patent: Dec. 13, 2022

(54) FACIAL INTERFACES FOR HEAD-MOUNTED DISPLAYS AND RELATED SYSTEMS AND METHODS

(71) Applicant: META PLATFORMS TECHNOLOGIES, LLC, Menlo Park, CA (US)

(72) Inventors: Shane Michael Ellis, Bellevue, WA (US); Peter Wesley Bristol, Seattle, WA (US); Joseph Patrick Sullivan, Seattle, CA (US); Brian Lawrence Chuang, Seattle, WA (US); David Michael Pickett, Seattle, WA (US); Kristen Renee Hayenga, Redmond, WA (US); Xiao Xiong Qin, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 324 days.

(21) Appl. No.: 16/797,086

(22) Filed: Feb. 21, 2020

(65) Prior Publication Data
US 2021/0263323 A1    Aug. 26, 2021

(51) Int. Cl.
| | | |
|---|---|---|
| *G02B 27/01* | (2006.01) | |
| *B29C 44/12* | (2006.01) | |
| *G06F 1/16* | (2006.01) | |
| *B29C 67/24* | (2006.01) | |
| *B29C 44/58* | (2006.01) | |
| *B29C 44/42* | (2006.01) | |

(Continued)

(52) U.S. Cl.
CPC .......... *G02B 27/0176* (2013.01); *B29C 44/12* (2013.01); *G06F 1/163* (2013.01); *B29K 2075/00* (2013.01); *B29L 2031/3475* (2013.01); *G02B 2027/0178* (2013.01)

(58) Field of Classification Search
USPC ....................................................... 24/31, 3.1
See application file for complete search history.

(56) References Cited

U.S. PATENT DOCUMENTS

| | | | |
|---|---|---|---|
| 5,319,396 A | | 6/1994 | Cesarczyk |
| 10,133,305 B1 * | | 11/2018 | Sullivan ................ G06F 1/1637 |

(Continued)

FOREIGN PATENT DOCUMENTS

| | | |
|---|---|---|
| CN | 108345109 A | 7/2018 |
| WO | 2019/161532 A1 | 8/2019 |

OTHER PUBLICATIONS

International Search Report and Written Opinion received for PCT Application Serial No. PCT/US2020/067081 dated Mar. 23, 2021, 14 pages.

(Continued)

*Primary Examiner* — Chineyere D Wills-Burns
(74) *Attorney, Agent, or Firm* — FisherBroyles, LLP

(57) ABSTRACT

A head-mounted display may include a frame for supporting an electronic display for viewing by an intended user donning the head-mounted display. The frame may include a flange disposed on a perimeter area of the frame and a facial interface configured to abut against an intended user's face wherein the facial interface comprises a foam body and an undercut region in the foam body that is sized and shaped for detachably engaging with the flange of the frame. Various other apparatuses, systems, and methods are also disclosed.

11 Claims, 9 Drawing Sheets

(51) Int. Cl.
    *B29C 44/56*     (2006.01)
    *G02B 27/00*     (2006.01)
    *G02C 11/00*     (2006.01)
    *G02C 11/08*     (2006.01)
    *B29K 75/00*     (2006.01)
    *B29L 31/34*     (2006.01)

(56) References Cited

U.S. PATENT DOCUMENTS

| | | | | |
|---|---|---|---|---|
| 10,496,130 | B1* | 12/2019 | Yee | F16M 13/04 |
| 10,545,349 | B1* | 1/2020 | Sullivan | B29C 43/52 |
| 2005/0168824 | A1 | 8/2005 | Travers et al. | |
| 2015/0253574 | A1 | 9/2015 | Thurber | |
| 2016/0366399 | A1* | 12/2016 | Tempel | H04N 13/344 |
| 2017/0082859 | A1* | 3/2017 | Drinkwater | G02B 27/0176 |
| 2017/0192198 | A1* | 7/2017 | Bristol | G02B 7/22 |
| 2018/0348812 | A1* | 12/2018 | Miller | H04N 5/2251 |
| 2019/0041899 | A1* | 2/2019 | Ellis | G02B 27/0176 |
| 2020/0400963 | A1* | 12/2020 | Liu | B29C 45/14467 |

OTHER PUBLICATIONS

International Preliminary Report on Patentability for International Application No. PCT/US2020/067081, dated Sep. 1, 2022, 12 pages.

\* cited by examiner

700

Position a mold insert in a mold that has an internal cavity defining a shape of a facial interface for a head-mounted display
710

Inject at least two materials into the mold to surround at least a base of the mold insert
720

Cure the at least two materials to form a foam body with an undercut region defined by the mold insert
730

Remove the foam body from the mold
740

Decouple the mold insert from the foam body
750

*FIG. 7*

FACIAL INTERFACES FOR HEAD-MOUNTED DISPLAYS AND RELATED SYSTEMS AND METHODS

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 7 is a flow diagram illustrating an example method of fabricating a facial interface with securing pegs, according to at least one embodiment of the present disclosure.

Figure 1:
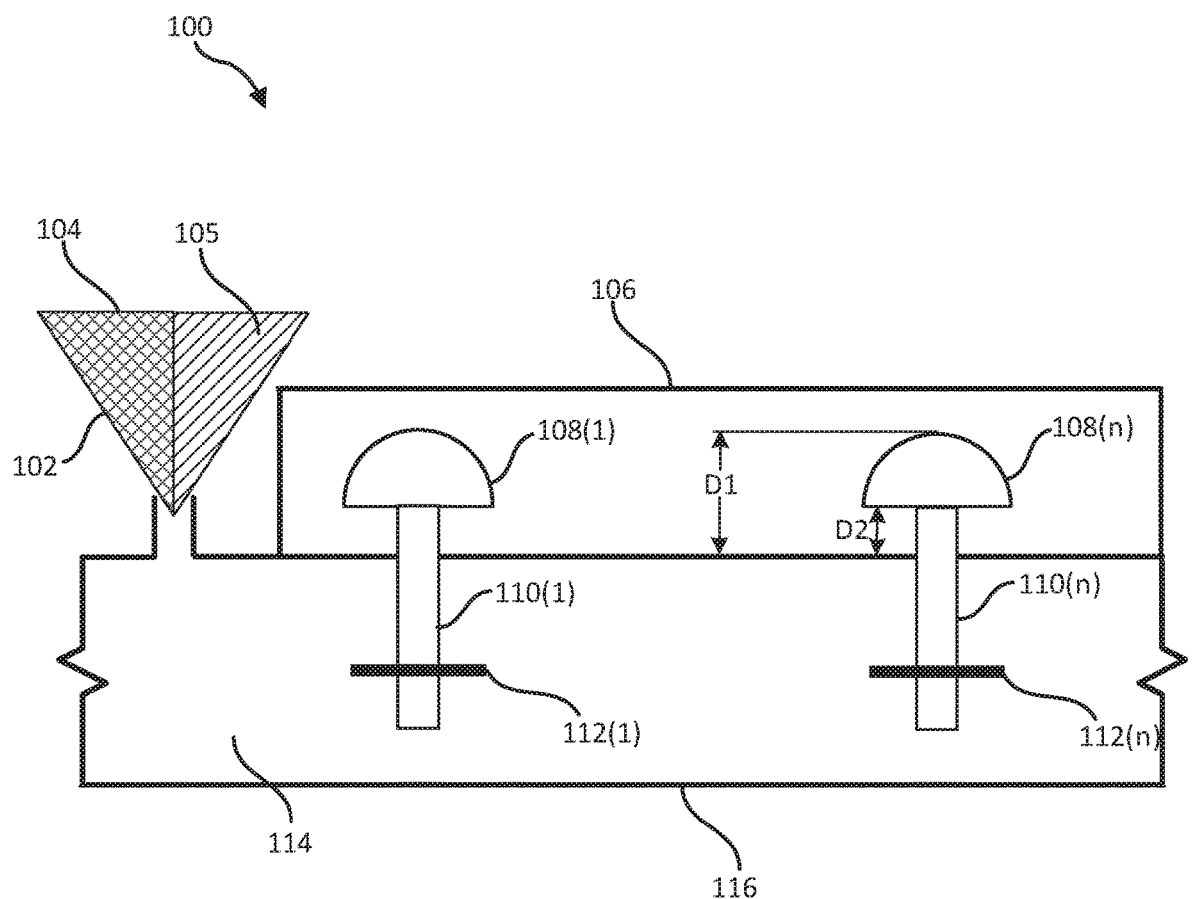
FIG. 1 illustrates an example system for molding a facial interface with securing pegs, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

Putting on an artificial-reality head-mounted display system may be the beginning of a thrilling experience, one that may be more immersive than almost any other digital entertainment or simulation experience available today. Head-mounted display systems may enable users to have the sensation of travelling through space and time, to interact with friends in a three-dimensional world, or to play video games in a radically redefined way. Head-mounted display systems may also be used for purposes other than recreation—for example, governments may use them for military training simulations, doctors may use them to practice surgery, and engineers may use them as visualization aids.

In an artificial-reality head-mounted display system, making the experience functional and comfortable is often helpful to creating an effective user experience. However, some design features of head-mounted display systems may potentially interfere with a comfortable and versatile experience. For example, a head-mounted display system may be uncomfortable for the user to wear for an extended period of time due to the materials or shape of the head-mounted display system. Since many head-mounted display systems may be relatively heavy with most of their weight distributed toward the front, an uncomfortable fit may result in significant pressure on a user's face, leading to discomfort that may make an artificial-reality experience less compelling.

As will be described in greater detail below, the instant disclosure describes a facial interface for a wearable device, such as a head-mounted display system, that includes an undercut region and pegs for securing the facial interface to a frame of the wearable device. As described in greater detail herein, a facial interface with an undercut region and securing pegs may create a number of advantages and benefits including, without limitation, increased functionality, maintenance, and upgradeability by enabling users to attach and/or detach the facial interface from the wearable device. In addition, a facial interface with an undercut region and securing pegs may increase user comfort due to the soft, washable, conforming material of the foam-based facial interface.

Features from any of the disclosed embodiments may be used in combination with one another in accordance with the general principles described herein. These and other embodiments, features, and advantages will be more fully understood upon reading the following detailed description in conjunction with the accompanying drawings and claims.

Figure 2:
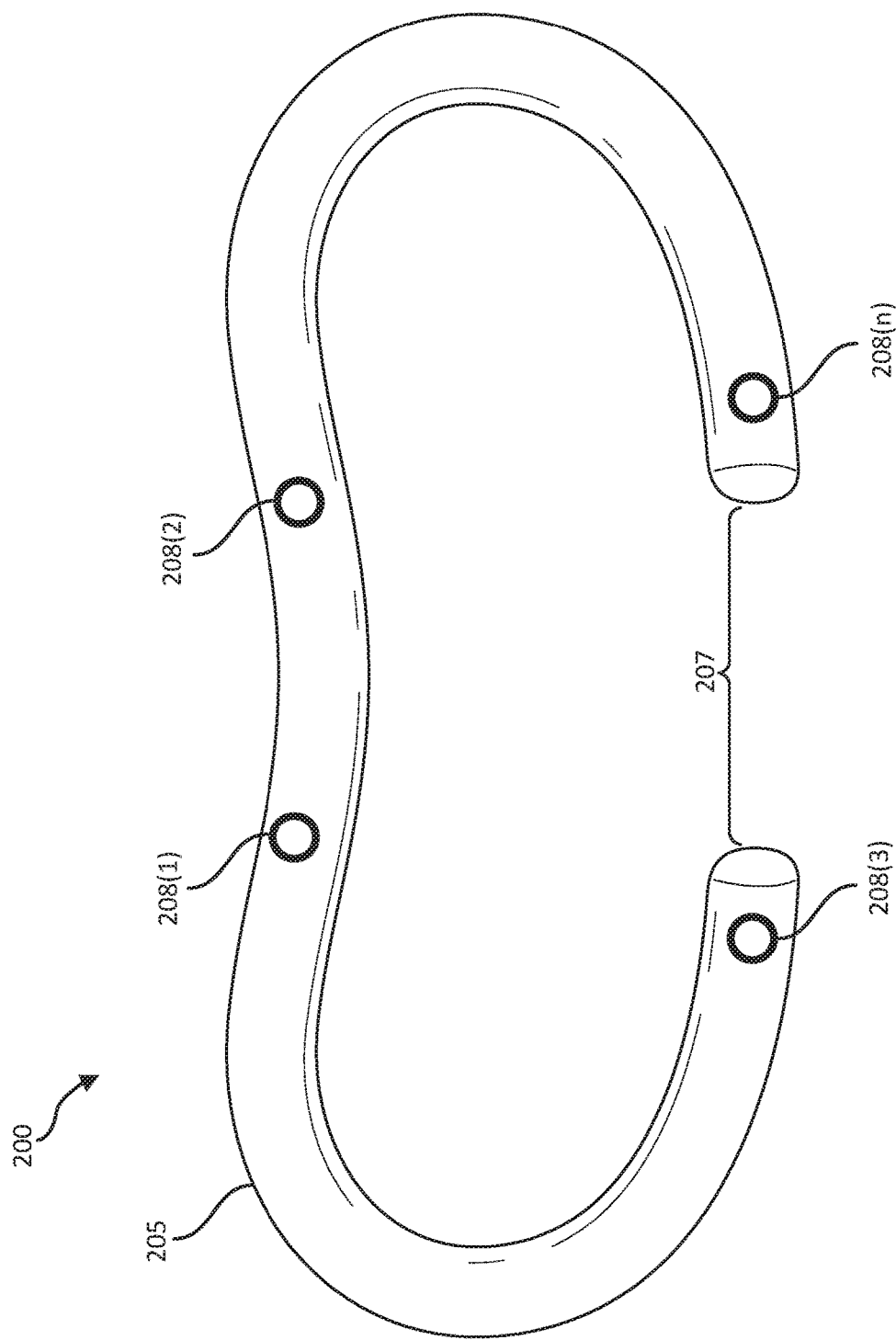
FIG. 2 illustrates a rear plan view of an example facial interface with securing pegs, according to at least one embodiment of the present disclosure.
Figure 3A:
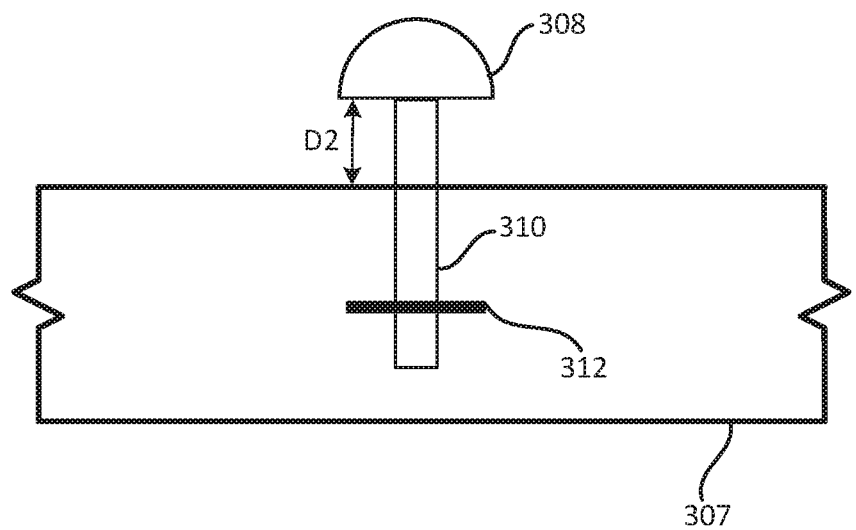
FIG. 3A illustrates a cross-sectional view of an example of a securing peg secured within a facial interface, according to at least one embodiment of the present disclosure.
Figure 3B:
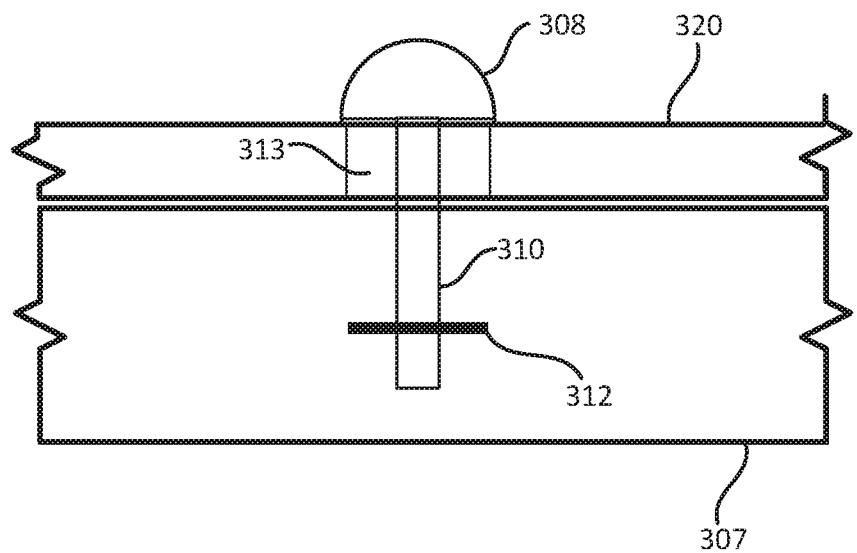
FIG. 3B illustrates a cross-sectional view of an example of a facial interface secured to a frame of a wearable device by a securing peg, according to at least one embodiment of the present disclosure.
Figure 4:
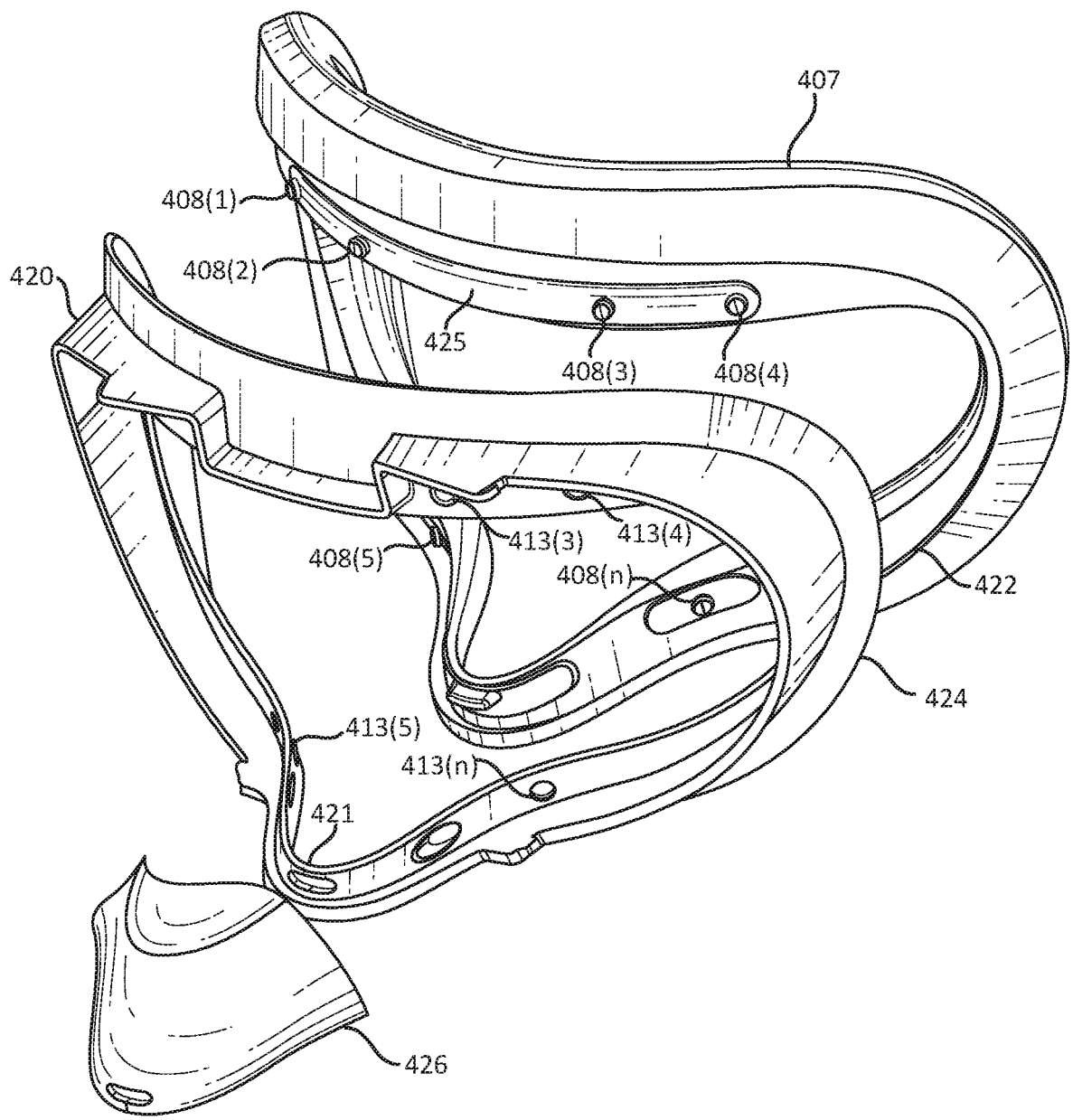
FIG. 4 illustrates a perspective view of an example facial interface and a frame of a wearable device, according to at least one embodiment of the present disclosure.
Figure 5:
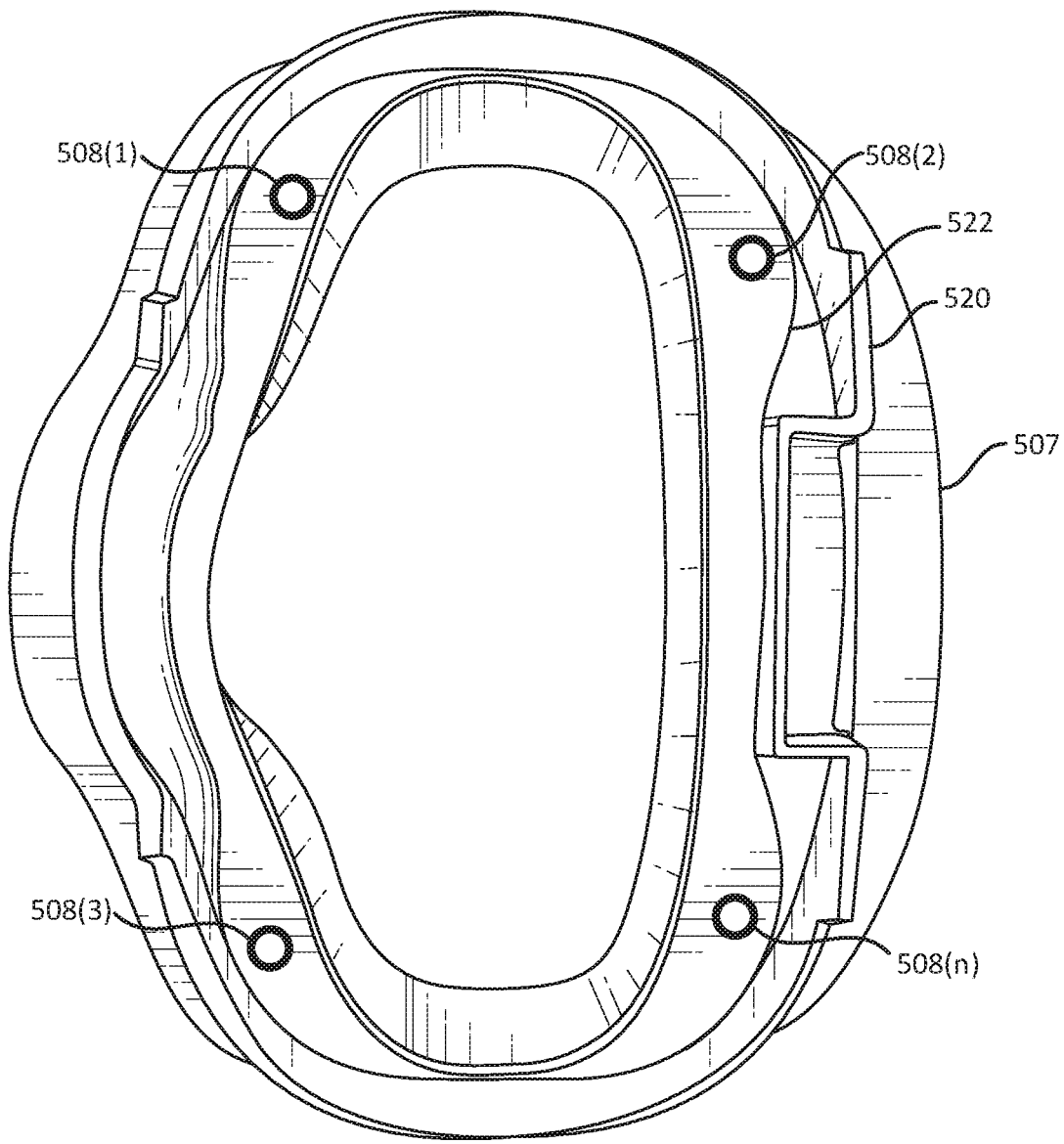
FIG. 5 illustrates a rear plan view of an example facial interface secured to a frame of a wearable device using securing pegs, according to at least one embodiment of the present disclosure.
Figure 6:
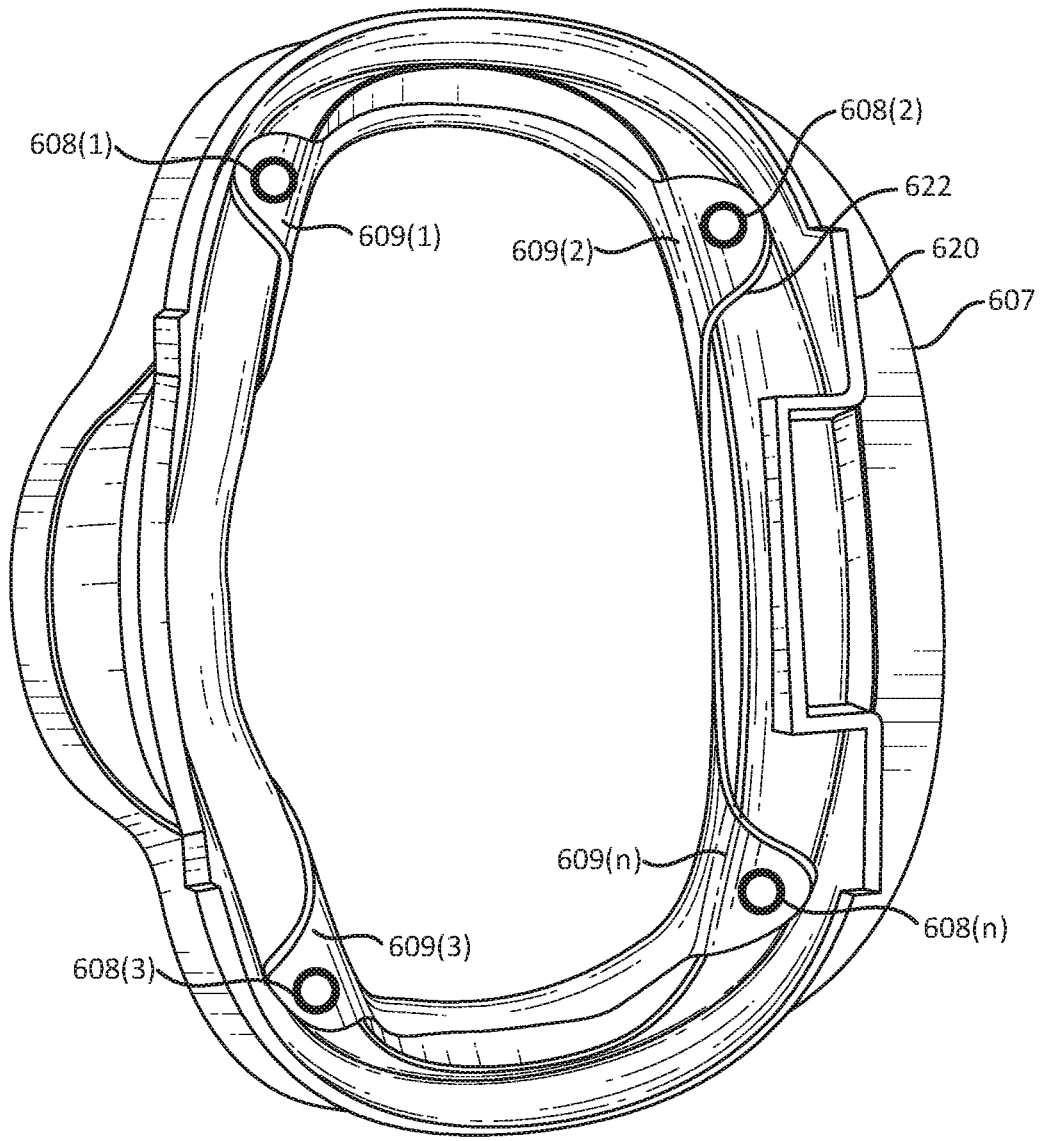
FIG. 6 illustrates a rear plan view of another example facial interface secured to a frame of a wearable device using securing pegs, according to at least one embodiment of the present disclosure.
Figure 8:
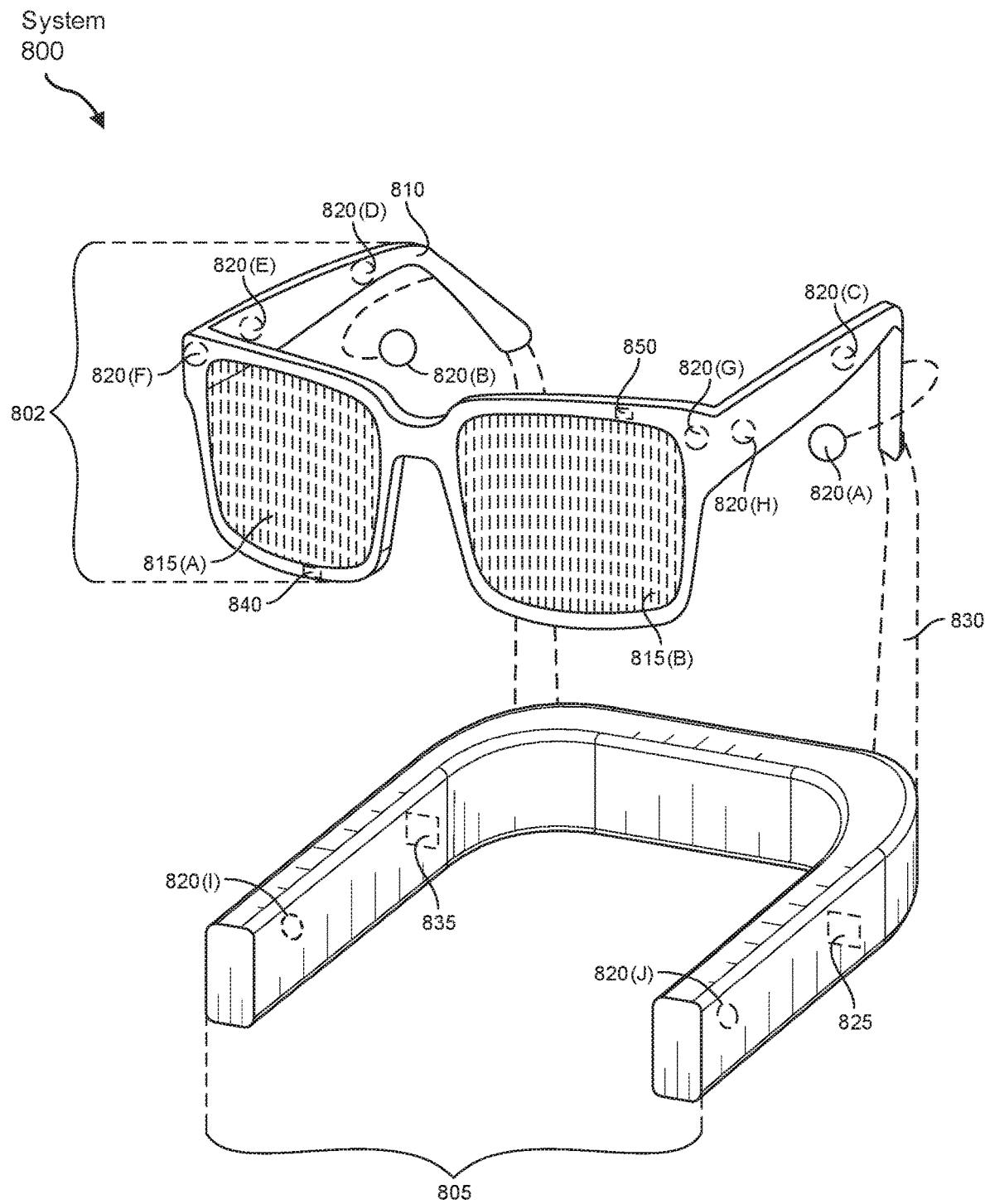
FIG. 8 is an illustration of example augmented-reality glasses that may be used in connection with embodiments of this disclosure.
Figure 9:
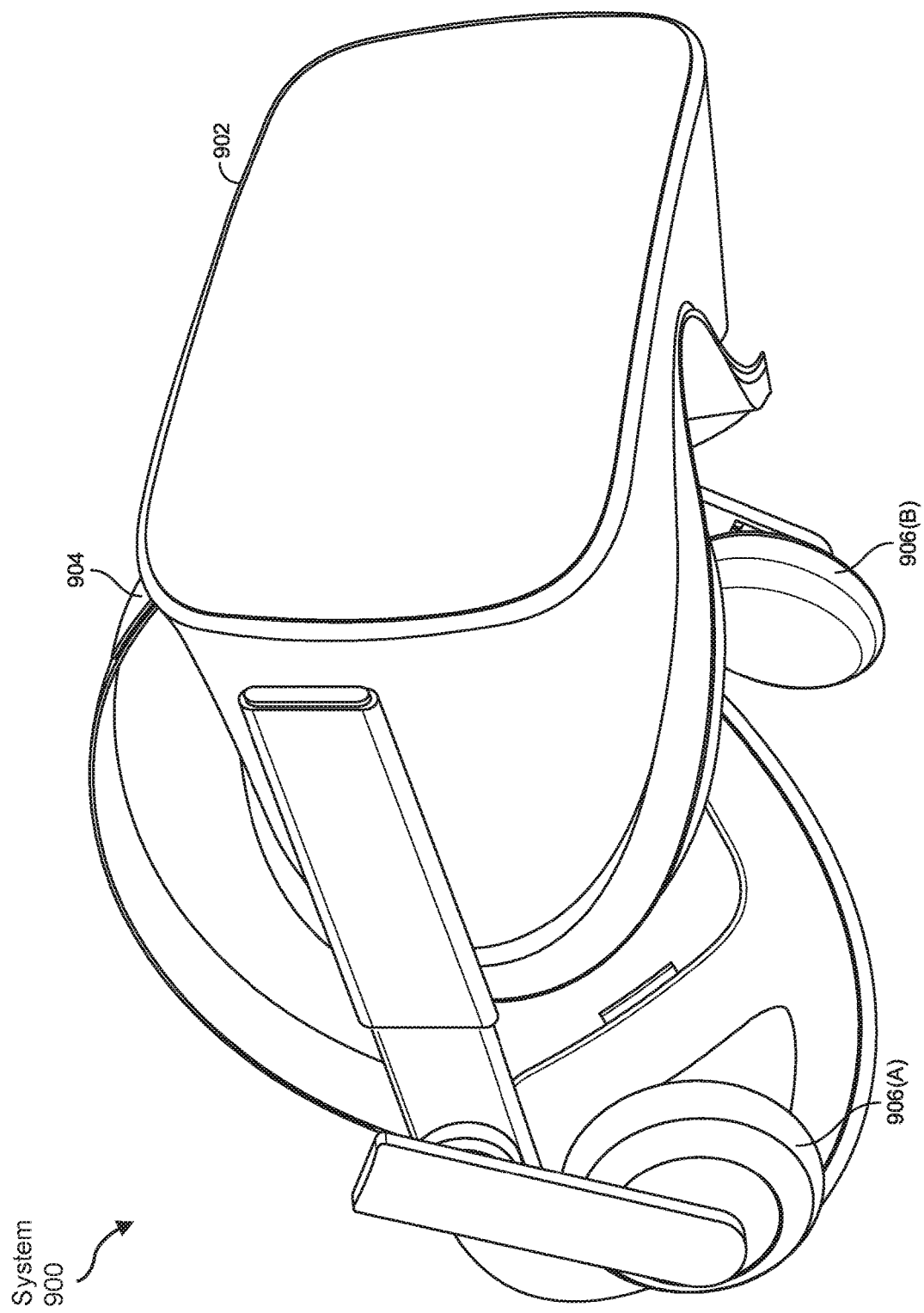
FIG. 9 is an illustration of an example virtual-reality headset that may be used in connection with embodiments of this disclosure.

The following will provide, with reference to FIGS. 1-9, detailed descriptions of a facial interface with an undercut region and securing pegs and related systems and methods. First, a description of various methods of producing a facial interface with an undercut region and securing pegs is presented in reference to FIGS. 1-2. FIGS. 3A and 3B illustrate a method of securing a facial interface to a frame of a wearable device using an undercut region and pegs. FIGS. 4-6 illustrate various configurations for securing a facial interface to a frame of a wearable device using an undercut region and pegs. FIG. 7 illustrates an example method of fabricating a facial interface with an undercut region and securing pegs. FIGS. 8-9 illustrate various types of example artificial-reality devices that may be used with a facial interface with an undercut region and securing pegs.

FIG. 1 illustrates an example system 100 for molding a facial interface with an undercut region and securing pegs 108(1) ... 108(n). A facial interface for a device worn on a user's face may include a foam material for abutting a wearable device (e.g., a head-mounted display) against the user's face. The facial interface may have an undercut region that is configured to engage a flange of a frame of a wearable device and multiple pegs 108(1) ... 108(n) extending from the foam material that enable the facial interface to be secured to a frame of the wearable device. An example method of producing the facial interface may include injecting a liquid material such as first polymer material 104 (e.g., a first polyurethane material) and second polymer material 105 (e.g., a second polyurethane material) into a mold 116 that includes a mold insert 106 for holding pegs 108(1) . . . 108(*n*) in place during the molding process. In addition, mold insert 106 may define the shape of the undercut region. The process steps for producing a facial interface with an undercut region and securing pegs may be executed in any order. For example, pegs 108(1) . . . 108(*n*) may be placed in cavities of mold insert 106 in a secure manner. For example, pegs 108(1) . . . 108(*n*) may be secured in mold insert 106 using an interference fit in which an inner diameter of the cavity of mold insert 106 is dimensioned and configured to provide a sufficient level of friction against an outer perimeter surface of pegs 108(1) . . . 108(*n*) to hold pegs 108(1) . . . 108(*n*) in place during the molding and/or curing process. In some examples, pegs 108(1) . . . 108(*n*) may be positioned in the cavity of mold insert 106 at a depth D1 (e.g., an engagement length) such that a gap distance D2 is created between the bottom of the head of pegs 108(1) . . . 108(*n*) and a surface of the facial interface. As described in detail below with respect to FIGS. 3 and 4, the facial interface produced by system 100 may be secured to a flange on a frame of the wearable device. Gap distance D2 may be configured such that pegs 108(1) . . . 108(*n*) secure the facial interface to the flange, with at least a portion of the flange fitting within gap distance D2.

Mold insert 106 with pegs 108(1) . . . 108(*n*) held in cavities of mold insert 106 may be positioned adjacent to mold 116 and secured to mold 116 for the duration of the molding and curing process. The molding process may include a reaction injection molding (RIM) process (e.g., to form an injection molded foam) that creates a soft foam facial interface. In some examples, a non-porous material may be applied (e.g., sprayed) onto an inner surface of cavity 114 prior to the RIM process. The non-porous material may create a smooth surface on the facial interface thereby increasing the comfort of a user donning a wearable device with the facial interface. The smooth, non-porous surface material may also be easily cleaned by the user. A hopper 102 may hold first polymer material 104 and second polymer material 105 that are injected into cavity 114 of mold 116. First polymer material 104 and second polymer material 105 may include, without limitation, polyurethane, polyisocyanate, polyol, surfactant, catalyst, polyester, polyether, polyethylene, polypropylene, polyvinyl chloride, polychloroprene, polyisoprene, chloroprene, styrene-butadiene, ethylene-propylene-diene-monomer, polyisobutylene, polystyrene, or a combination thereof. First polymer material 104 and second polymer material 105 may be injected (e.g., squirted) under pressure into cavity 114 of mold 116 before mold 116 is closed. A liquid material such as first polymer material 104 and second polymer material 105 may be injected into mold 116 by an automated machine such as a robotic arm. First polymer material 104 and second polymer material 105 may be combined in specific ratios to produce the desired characteristics (e.g., softness, durability, etc.) of the facial interface. The chemical reaction between first polymer material 104 and second polymer material 105 may cause the combined material to foam and fill the space within cavity 114. First polymer material 104 and second polymer material 105 may be combined in the tip of an injection nozzle and/or within cavity 114. Cavity 114 and mold insert 106 may be configured to form the overall shape of the facial interface (e.g., a closed loop shape, an open loop shape, etc.) and the undercut region. First polymer material 104 and second polymer material 105 may be a liquid material when injected into cavity 114. A gas (e.g., carbon dioxide, nitrogen, etc.) may act as a blowing agent and may also be injected into cavity 114 to create pockets in the combined first polymer material 104 and second polymer material 105. The combined first polymer material 104 and second polymer material 105 may conform to the inner dimensions of cavity 114. Combined first polymer material 104 and second polymer material 105 may be formed in cavity 114, resulting in an open cell foam and/or a closed cell foam. In embodiments in which a closed-cell foam is formed, the gas may form discrete pockets with each pocket completely surrounded by the combined first polymer material 104 and second polymer material 105. In embodiments in which an open-cell foam is formed, the gas pockets may connect to each other allowing the gas to pass between the pockets and through the resulting foam facial interface.

Combined first polymer material 104 and second polymer material 105 may be injected into cavity 114 such that the combined first polymer material 104 and second polymer material 105 at least partially surround a base 112(1) . . . 112(*n*) of pegs 108(1) . . . 108(*n*) and/or a shaft 110(1) . . . 110(*n*) of pegs 108(1) . . . 108(*n*). A device (e.g., a ram and/or a screw-type plunger) may force first polymer material 104 and second polymer material 105 (e.g., first polymer material 104 and second polymer material 105 in liquid form) into cavity 114 of mold 116. Combined first polymer material 104 and second polymer material 105 may cure within mold 116 after a set amount of time to form a foam body. The molding and curing process may occur at room temperature. After curing, mold insert 106 may be removed from mold 116, foam body may be removed from cavity 114, and mold insert 106 may be removed from the head of pegs 108(1) . . . 108(*n*). After the removal process, the foam body may include a formed undercut region (e.g., defined by mold insert 106) and securely hold base 112(1) . . . 112(*n*) and/or shaft 110(1) . . . 110(*n*) in place. The head of pegs 108(1) . . . 108(*n*) may extend through respective apertures defined in the foam body.

In another example embodiment, a facial interface may be produced from a foam sheet. For example, a foam sheet may be inserted into a cavity of mold 116. The foam sheet may be sized and cut prior to insertion into mold 116. Mold insert 106 may be positioned on top of the foam sheet. The foam sheet may be at least partially folded around mold insert 106 such that the foam sheet retains the shape of mold insert 106 and creates an undercut region defined by the mold insert. The foam sheet may be exposed to a catalyst agent (e.g., heat, pressure, gas, etc.) in order to help the foam sheet retain the shape of mold insert 106 and the undercut region after removal from mold 116. The molded foam sheet and mold insert 106 may be removed from mold 116 and mold insert 106 may be removed from the molded foam sheet. At least two posts that may be similar to pegs 108(1) . . . 108(*n*) may be attached to the molded foam sheet such that at least a portion of the at least two posts extend from the molded foam sheet.

In some examples, a microtexture may be applied to the surface of the facial interface. The microtexture may be applied to the facial interface before, during, or after the molding process. The microtexture may create a smooth and comfortable surface to abut against the face of the user. The microtexture may also inhibit (e.g., reduce or eliminate) wrinkling of the surface of the facial interface when the facial interface is curved to conform to the curvature of the frame of the wearable device.

FIG. 2 illustrates a rear plan view of an example facial interface 200 with an undercut region and securing pegs 208(1) . . . 208(*n*). Facial interface 200 may be configured to be secured to a wearable device frame (e.g., secured to a flange of a wearable device frame) such that when the wearable device is donned by a user, foam material 205 may provide a comfortable surface to interface with the user's face. By way of example, the wearable device may be system 800 of FIG. 8 or system 900 of FIG. 9. Facial interface 200 may also serve as a gasket to inhibit ambient light from entering an interior section of the wearable device, thereby reducing the amount of light interfering with the user's view of a display of the wearable device. Facial interface 200 may have securing pegs 208(1) . . . 208(n) positioned on foam material 205 to detachably secure facial interface 200 to a wearable device frame. Pegs 208(1) . . . 208(n) may allow a user to repeatedly attach and/or detach facial interface 200 from the frame of the wearable device. Further, the user may easily remove and replace facial interface 200 with a facial interface having different configurations and/or different dimensions. Different facial interface configurations may accommodate different user facial structures and shapes as well as provide space for use with glasses. Facial interface 200 may include an open loop shape having an open gap 207. Open gap 207 in the loop of facial interface 200 may be used to accommodate a user's nose and/or a detachable nose piece. In some embodiments, the wearable device may be provided with interchangeable facial interfaces of different configurations among which a user may select to obtain the best fit for the user's face, glasses, and/or preferences. Pegs 208(1) . . . 208(n) may be positioned at locations on foam material 205 such that when facial interface 200 is attached to the wearable device, facial interface 200 is secured to the wearable device. Alternatively or additionally, facial interface 200 may be secured to the wearable device by the undercut region engaging the flange of the wearable device. For example, when a user donning the wearable device creates inertial forces on the wearable device through movement, facial interface 200 may remain securely positioned on the wearable device. When installed, facial interface 200 may be removably secured to the wearable device, such that the user may remove and replace facial interface 200 as desired.

While FIG. 2 illustrates facial interface 200 in a particular shape, the present disclosure is not so limited. In additional embodiments, the facial interface 200 may have another shape corresponding to a shape of another wearable device. Accordingly, the shape of facial interface 200 may be tailored for use with different wearable devices.

FIG. 3A illustrates a cross section view of securing peg 308 secured within facial interface 307. Peg 308 may be secured within facial interface 307 via the method described above with respect to FIG. 1. For example, base 312 and a lower portion of peg shaft 310 may be secured in the cured foam material of facial interface 307. An upper portion of shaft 310 and the head of peg 308 may extend through respective apertures defined in the cured foam material of facial interface 307. The upper portion of shaft 310 may extend above a surface of facial interface 307 by distance D2. Distance D2 may be configured such that when peg 308 is inserted into a slot 313 (e.g., a hole) of a frame 320 of a wearable device, as shown in FIG. 3B, facial interface 307 is secured (e.g., removably secured) to the frame of the wearable device. Peg 308 may be made of a material (e.g., an injection molded plastic material) with a property (e.g., an elastic modulus, a Young's modulus, etc.) that allows peg 308 to be inserted in slot 313 in the wearable device frame such that peg 308 secures facial interface 307 to the frame.

FIG. 3B illustrates a cross section view of facial interface 307 secured to frame 320 by securing peg 308. Peg 308 may include a head that has any type of shape including, but not limited to, a hemisphere shape (e.g., a mushroom shape). In additional embodiments, peg 308 may have other shapes, such as bulbous, spherical, conical, cylindrical, frustoconical, etc. The head of peg 308 may be configured with a diameter larger than slot 313 in frame 320 such that when peg 308 is inserted through slot 313 in frame 320, peg 308 will remain secure when exposed to external forces associated with typical use (e.g., when supporting a wearable device on a user's face). Further, peg 308 may be shaped and/or configured to withstand repeated cycles of insertion and extraction from frame 320 without significant degradation.

FIG. 4 illustrates a perspective view of an example facial interface 407 and a frame 420 of a wearable device. As described above with respect to FIG. 3B, pegs 408(1) . . . 408(n) may secure facial interface 407 to frame 420. Facial interface 407 may have any number of pegs 408(1) . . . 408(n) necessary to secure facial interface 407 to frame 420. Further, pegs 408(1) . . . 408(n) may be located at any position on facial interface 407 necessary to secure facial interface 407 to frame 420. For example, facial interface 407 may have two pegs 408(1) . . . 408(n) configured to be disposed on opposing sides of a nose bridge 421 of frame 420 when facial interface 407 is secured to frame 420. Additionally or alternatively, facial interface 407 may have pegs 408(1) . . . 408(n) positioned along a forehead area 425 of frame 420 when facial interface 407 is secured to frame 420. In some examples, facial interface 407 may have additional pegs 408(1) . . . 408(n) located along the perimeter of facial interface 407. Pegs 408(1) . . . 408(n) may be inserted into respective slots 413(1) . . . 413(n) in frame 420, to secure facial interface 407 to frame 420.

In some examples, facial interface 407 may include an undercut region 422 (e.g., a slot, a groove, a channel, etc.) that may provide additional mechanical security for securing facial interface 407 to frame 420. Undercut region 422 may be produced during the molding process described above with respect to FIG. 1. For example, mold insert 106 may be shaped and/or configured to produce undercut region 422. When first polymer material 104 and second polymer material 105 are injected into mold 116, undercut region 422 may be formed as combined first polymer material 104 and second polymer material 105 form around mold insert 106. Undercut region 422 in facial interface 407 may allow a flange 424 of frame 420 to be inserted into undercut region 422. Undercut region 422 may extend around at least part of the perimeter of facial interface 407 and may substantially surround flange 424 when facial interface 407 is secured to frame 420.

In some examples, frame 420 may include a detachable nose piece 426 and facial interface 407 may be shaped to accommodate detachable nose piece 426 when detachable nose piece 426 is secured to frame 420. Detachable nose piece 426 may be shaped and configured to inhibit the passage of light past the user's nose. As described in detail with respect to FIG. 2 above, facial interface 407 may include an open loop shape including gap 207. Gap 207 in the loop of facial interface 407 may be used to accommodate detachable nose piece 426. For example, detachable nose piece 426 may be positioned within the gap 207 (if present) of facial interface 407 when detachable nose piece 426 is secured to frame 420. Further, the open loop shape may be configured to conform to contours of the user's face when the wearable device is donned by the user.

In some examples, facial interface 407 may include a closed loop shape without a gap in nose bridge 421 (as illustrated in FIG. 4). Facial interface 407 may extend under detachable nose piece 426 when detachable nose piece 426 is secured to frame 420. The thickness of facial interface 407 may be reduced in the area under nose bridge 421 in order to comfortably accommodate a user's nose. Facial interface 407 may extend under detachable nose piece 426 to inhibit contact between detachable nose piece 426 and the user's face thereby increasing comfort for the user. In some examples, detachable nose piece 426 may be configured to be trimmed by the user to better fit the nose of the user. For example, grooves or lines may be provided in the detachable nose piece 426 to guide a user trimming detachable nose piece 426. Additionally or alternatively, detachable nose piece 426 may be formed of a material and at a thickness to facilitate trimming, such as with scissors. Further, the closed loop shape may be configured to conform to contours of the user's face when the wearable device is donned by the user.

FIG. 5 illustrates a rear plan view (e.g., a view looking toward the user when the user is donning the wearable device) of an example facial interface 507 secured to a frame 520 of a wearable device using pegs 508(1) . . . 508(n). As described above with respect to FIG. 3B, pegs 508(1) . . . 508(n) may secure facial interface 507 to frame 520. FIG. 5 shows the head of pegs 508(1) . . . 508(n) extended through slots in frame 520. Further, FIG. 5 shows facial interface 507 configured with a flange disposed on a perimeter area of frame 520 inserted into an undercut region 522 of facial interface 507. Facial interface 507 may partially wrap around the flange of frame 520 to provide mechanical security in addition to pegs 508(1) . . . 508(n) extending through slots in frame 520.

FIG. 6 illustrates a rear plan view (e.g., a view looking toward the user when the user is donning the wearable device) of another example facial interface 607 secured to a frame 620 of a wearable device using posts 608(1) . . . 608(n). As described above with respect to FIG. 3B, posts 608(1) . . . 608(n) may perform similar functions as peg 308 and may secure facial interface 607 to frame 620. Additionally or alternatively, facial interface 607 may include tabs 609(1) . . . 609(n). Tabs 609(1) . . . 609(n) may include the same foam material as that used in facial interface 607 or tabs 609(1) . . . 609(n) may be formed separately and attached to facial interface 607. For example, tabs 609(1) . . . 609(n) may be formed according to the process described with respect to FIG. 1. Mold 116 may include areas used to form tabs 609(1) . . . 609(n) during the molding process. FIG. 6 shows the head of posts 608(1) . . . 608(n) secured to frame 620 and extending through slots in tabs 609(1) . . . 609(n). Further, FIG. 6 shows facial interface 607 configured with a flange disposed on a perimeter area of frame 620 inserted into an undercut region 622 of facial interface 607. Facial interface 607 may partially wrap around the flange of frame 620 to provide mechanical stability in addition to posts 608(1) . . . 608(n) secured to frame 620 extending through slots in tabs 609(1) . . . 609(n).

Any of facial interfaces 200, 307, 407, 507, and 607 described above may be supported by a wearable device (e.g., a head-mounted display, etc.), such as the system 800 described below with reference to FIG. 8 or the system 900 described below with reference to FIG. 9. Facial interfaces 200, 307, 407, 507, and 607 may be supported in or on wearable devices in a position to provide comfort to a user (e.g., an intended user) when the wearable device is donned by the user.

FIG. 7 is a flow diagram illustrating a method 700 of fabricating a facial interface with an undercut region. At operation 710, the method may include positioning a mold insert in a mold that has an internal cavity defining a shape of a facial interface for a head-mounted display, such as mold insert 106 described above in FIG. 1. Operation 710 may be performed in a variety of ways, such as configuring and dimensioning an inner cavity of the mold to define the undercut region.

At operation 720, method 700 may include injecting liquid material into the mold to surround at least a base of the mold insert. Operation 720 may be performed in a variety of ways. For example, a hopper may hold two polymer (e.g., polyurethane) materials that may be injected into a cavity of the mold by a device (e.g., a ram, a robot arm, and/or a screw-type plunger) that forces the two polymer materials into the cavity. The two polymer materials may be combined in the cavity of the mold and/or in an injection nozzle. A blowing agent may be used to mix the two polymer materials and form a foam surrounding the mold insert.

At operation 730, method 700 may include curing the at least two polymer materials to form a foam body with an undercut region defined by the mold insert. Operation 730 may be performed in a variety of ways. For example, the foam body may set in the mold for a period of time to allow the foam body to cure into a soft and pliable facial interface.

At operation 740, method 700 may include removing the foam body from the mold. Operation 740 may be performed in a variety of ways. For example, the foam body may be removed manually from the mold or may be removed automatically (e.g., via robotic automation) from the mold.

At operation 750, method 700 may include decoupling the mold insert from the foam body. Operation 750 may be performed in a variety of ways. For example, the mold insert may be decoupled from the foam body manually or automatically (e.g., via robotic automation).

Accordingly, the present disclosure includes devices, systems, and methods that may be employed to improve and provide a facial interface for a wearable device. For example, an artificial-reality system may include a wearable article that includes a facial interface with an undercut region and securing pegs. The facial interface with an undercut region and securing pegs may provide a comfortable interface to an intended user's face when the wearable device is donned by the intended user. The facial interface with an undercut region and securing pegs may be repeatedly attached and detached to the wearable device by the user without degrading the mechanical security provided by the undercut region and securing pegs.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 9 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(1) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband

805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(1) and 820(J)) that are part of the microphone array (or potentially form their own microphone subarray). Neckband 805 may also include a controller 825 and a power source 835.

Acoustic transducers 820(1) and 820(J) of neckband 805 may be configured to detect sound and convert the detected sound into an electronic format (analog or digital). In the embodiment of FIG. 8, acoustic transducers 820(1) and 820(J) may be positioned on neckband 805, thereby increasing the distance between the neckband acoustic transducers 820(1) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902, a facial interface (e.g., facial interface 200, 307, 407, 507, 607 described above) with pegs for securing the facial interface to a frame of front rigid body 902, and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments.

By way of non-limiting examples, the following embodiments are included in the present disclosure.

Example 1: A head-mounted display, comprising a frame for supporting an electronic display for viewing by an intended user donning the head-mounted display, wherein the frame comprises a flange disposed on a perimeter area of the frame, and a facial interface configured to abut against an intended user's face, wherein the facial interface comprises a foam body and an undercut region in the foam body that is sized and shaped for detachably engaging with the flange of the frame.

Example 2: The head-mounted display of Example 1, further comprising at least one cavity in the foam body in which respective bases of at least two securing pegs are positioned, wherein the at least two securing pegs are sized and configured to be inserted at least partially within corresponding slots in the frame.

Example 3: The head-mounted display of Example 1 or Example 2, wherein the at least two securing pegs are configured to be disposed on opposing sides of a nose bridge of the frame of the head-mounted display when the facial interface is secured to the frame of the head-mounted display.

Example 4: The head-mounted display of any of Examples 1 through 3, wherein the facial interface has a closed loop shape that is configured to conform to contours of the intended user's face.

Example 5: The head-mounted display of any of Examples 1 through 4, wherein the facial interface has an open loop shape that is configured to conform to contours of the intended user's face.

Example 6: The head-mounted display of any of Examples 1 through 5, wherein the frame comprises at least two securing posts that are sized and configured to be inserted at least partially within corresponding slots in the foam body.

Example 7: The head-mounted display of any of Examples 1 through 6, further comprising a detachable nose piece, wherein the facial interface is shaped to accommodate the detachable nose piece when the detachable nose piece is secured to the frame of the head-mounted display.

Example 8: The head-mounted display of any of Examples 1 through 7, wherein the facial interface comprises a closed loop shape that is configured to extend under the detachable nose piece when the detachable nose piece is secured to the frame of the head-mounted display, and inhibit contact between the detachable nose piece and the intended user's face.

Example 9: The head-mounted display of any of Examples 1 through 8, wherein the facial interface is further configured to abut against the intended user's face to support the frame.

Example 10: A method comprising positioning a mold insert in a mold that has an internal cavity defining a shape of a facial interface for a head-mounted display, injecting liquid material into the mold to surround at least a base of the mold insert, curing the liquid material to form a foam body with an undercut region defined by the mold insert, removing the foam body from the mold, and decoupling the mold insert from the foam body.

Example 11: The method of Example 10, further comprising applying a non-porous material to a surface of the mold prior to injecting the liquid material into the mold.

Example 12: The method of Example 10 or Example 11, further comprising applying a microtexture coating to a surface of the foam body.

Example 13: The method of any of Examples 10 through 12, further comprising securing at least two pegs into the mold insert by attaching heads of the at least two pegs to the mold insert, wherein injecting the liquid material into the mold comprises surrounding respective bases of the at least two pegs with the liquid material.

Example 14: The method of any of Examples 10 through 13, wherein the undercut region is configured to engage a flange of a frame of a head-mounted display and the heads of the at least two pegs are configured to detachably secure the facial interface to the frame of the head-mounted display.

Example 15: The method of any of Examples 10 through 14, wherein curing the liquid material to form the foam body comprises forming a closed-cell foam.

Example 16: The method of any of Examples 10 through 15, wherein curing the liquid material to form the foam body comprises forming an open-cell foam.

Example 17: A method comprising inserting a foam sheet into a mold that has an internal cavity defining a shape of a facial interface for a head-mounted display, placing a mold insert onto the foam sheet within the mold, molding the foam sheet at least partially around the mold insert such that the foam sheet retains a shape of the mold insert and forms an undercut region defined by the mold insert, removing the molded foam sheet from the mold, and removing the mold insert from the molded foam sheet.

Example 18: The method of Example 17, further comprising applying a microtexture coating to a surface of the molded foam sheet.

Example 19: The method of Example 17 or Example 18, further comprising attaching at least two pegs to the molded foam sheet such that at least a portion of the at least two pegs extend from the molded foam sheet.

Example 20: The method of any of Examples 17 through 19, wherein the undercut region is configured to engage a flange of a frame of the head-mounted display and heads of the at least two pegs are configured to detachably secure the facial interface to the frame of the head-mounted display.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   positioning a mold insert in a mold that has an internal cavity defining a shape of a facial interface for a head-mounted display;
   applying a non-porous material to a surface of the mold;
   after applying the non-porous material to the surface of the mold, injecting a liquid material into the mold to surround at least a base of the mold insert;
   curing the liquid material to form a foam body with an undercut region defined by the mold insert;
   removing the foam body from the mold; and
   decoupling the mold insert from the foam body.

2. The method of claim 1, further comprising applying a microtexture coating to a surface of the foam body.

3. The method of claim 1, further comprising securing at least two pegs into the mold insert by attaching heads of the at least two pegs to the mold insert, wherein injecting the liquid material into the mold comprises surrounding respective bases of the at least two pegs with the liquid material.

4. The method of claim 3, wherein:
   the undercut region is configured to engage a flange of a frame of a head-mounted display; and
   the heads of the at least two pegs are configured to detachably secure the facial interface to the frame of the head-mounted display.

5. The method of claim 1, wherein curing the liquid material to form the foam body comprises forming a closed-cell foam.

6. The method of claim 1, wherein curing the liquid material to form the foam body comprises forming an open-cell foam.

7. A method comprising:
   positioning a mold insert in a mold that has an internal cavity defining a shape of a facial interface for a head-mounted display;
   securing at least two pegs into the mold insert by attaching heads of the at least two pegs to the mold insert;
   injecting a liquid material into the mold to surround at least a base of the mold insert and to surround respective bases of the at least two pegs with the liquid material;
   curing the liquid material to form a foam body with an undercut region defined by the mold insert;
   removing the foam body from the mold; and
   decoupling the mold insert from the foam body.

8. The method of claim 7, wherein:
   the undercut region is configured to engage a flange of a frame of a head-mounted display; and the heads of the at least two pegs are configured to detachably secure the facial interface to the frame of the head-mounted display.

9. The method of claim 7, wherein the mold is shaped to result in the foam body having a closed loop shape.

10. The method of claim 7, further comprising applying a microtexture coating to a surface of the foam body.

11. The method of claim 7, wherein, after curing the liquid material to form the foam body, the bases of the at least two pegs are surrounded by the foam body.

\* \* \* \* \*